United States Patent Office 3,501,572
Patented Mar. 17, 1970

3,501,572
COMPOSITIONS AND METHOD FOR CONTROL-
LING PARASITES IN ANIMALS WITH A COM-
BINATION OF A PHOSPHATE PESTICIDE, CAS-
TOR OIL AND A LOWER ALKANE
Melvin F. Handley, Freeport, Tex., assignor to The Dow
Chemical Company, Midland, Mich., a corporation of
Delaware
No Drawing. Continuation-in-part of application Ser. No.
460,841, June 2, 1965. This application Feb. 20, 1968,
Ser. No. 706,776
Int. Cl. A01m 9/36
U.S. Cl. 424—220         12 Claims

ABSTRACT OF THE DISCLOSURE

The disclosure is directed to a pesticide formulation composed of a phosphate pesticide, castor oil and a lower alkanol. The formulation is adapted to be applied to the exterior of animals and is harmless to the animal while toxic to insects and related pests.

Cross-reference to related application

This application is a continuation-in-part of application Ser. No. 460,841, filed June 2, 1965, now abandoned.

Background of the invention

The present invetnion is concerned with animal systemic pesticide application and is particularly directed to a specialized formulation for the application of certain animal systemic pesticides to the exterior of a living animal in a form which exhibits the pesticide in a readily-available form but does not irritate the animal.

The pesticides contemplated to be presented in the emollient formulation of the present invention are active systemic agents selected from the group consisting of certain phosphoramidate and thiophosphate pesticides, both of which are herein generically called phosphate pesticides. More particularly, the pesticides of the present invention are selected from the group of phosphoramidates having the formula

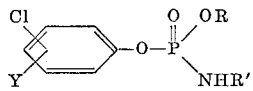

wherein R represents a lower alkyl radical containing from 1–4 carbon atoms, R' is selected from the group consisting of hydrogen and a lower aliphatic radical containing from 1–4 carbon atoms and Y represents a lower alkyl radical containing from 1–5 carbon atoms, and phosphorothioates having the formula

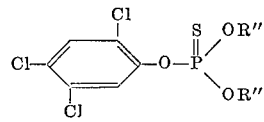

wherein each R" represents a methyl or ethyl radical.

Representative compounds of the above formulas are O,O-dimethyl-O-(2,4,5 - trichlorophenyl) phosphorothioate; O,O-diethyl-O-(2,4,5 - trichlorophenyl) phosphorothioate; and O-4-tert-butyl-2-chlorophenyl O-methyl methylphosphoramidate.

These phosphate pesticides are characterized by the fact that, when applied to the exterior of an animal infested or susceptible of becoming infested with any of a large number of insect and related pests, each substance can enter the bloodstream of the animal and be carried, generally speaking, throughout the tissues of the animal. In the animal, it can act effectively to destroy insect and related pests of the animal without hurting the animal itself.

Animals typical of those thus treated include cattle, horses, goats, sheep, swine, dogs, cats and, generally, domestic animals including economic animals and pets.

The use of phosphate pesticides has been attended by many benefits in the rearing of commercial and domestic animals. However, a serious problem has arisen in the application of these substances in solvents or the like. Dusts have been employed, but are not fully satisfactory because of the tendency to "dust" off, that is to say, to fall from the animal or be wiped away with consequent loss of toxicant.

Solutions and emulsions have previously been tried. However, between the co-solvents commonly used and emulsifying agents, it has been common and disconcerting to discover that, in use, the pesticide as formulated causes from serious to very serious surface irritation to the animal. This is because the emulsifiable oils are commonly of aromatic nature. These solvents cause unsightly skin damage, giving rise to injuries which are painful and to scuffing of the hide which looks inhumane, requires holdover periods for healing and is an economic loss to the owners.

Summary of the invention

The present invention provides a formulation of pesticide together with vehicle in which the pesticide is readily applied in any concentration within the range commonly used, is not only harmless to the animal but improves the appearance of the animal, and is attended with various other side benefits. In fact, in the absence of other considerations, the employment of the formulated toxicant as a grooming or dressing agent to assist in the preparation of animals for the show ring is highly satisfactory.

The formulation of the present invention comprises essentially from 2 to 20 percent by weight of the total formulation of the toxicant and a solvent mixture consisting of from 10 to 25 percent by weight castor oil and from 90 to 75 percent by weight of a lower alkanol.

The toxicant can be a combination of those hereinbefore designated. Among the toxicants, a choice will depend upon the particular animal to be treated, the particular conditions under which it is to be treated and the pest to be controlled.

The lower alkanol is a lower alkanol in the ordinary sense, that is to say, a monohydroxyalkanol being of from 1 to 4 carbon atoms or mixtures thereof. It is recognized that certain of these alkanols have some toxicity. However, in the employed amounts, and in view of the evaporation and loss commonly incident to the application of the present formulations, this may be ignored.

Among the lower alkanols, the most preferred is isopropanol. This substance is inexpensive and of toxicity so low as to be ignored under all circumstances of use. It has the further advantage that its formulations are less readily flammable than formulations with other lower alkanols.

In the best method known to the inventor at the present time of practicing the present invention, the castor oil and the lower alkanol are mixed together with stirring to obtain a completely miscible solvent mixture. This composite solvent mixture, the proportions of which are calculated to obtain a resulting product of the desired composition, is then used as a solvent in which the organophosphorus pesticide is dissolved.

The solvent mixture is composed of two completely miscible components. That is, the castor oil and the lower alkanol are completely miscible over a temperature range extending from about 0° F. to at least 70° F. This can be seen from the comparison in Table I.

TABLE I

| Oil | Volumes of Layers in Milliliters at— | | | | | |
|---|---|---|---|---|---|---|
| | 70° F. | | 40° F. | | 0° F. | |
| | Lower Oily | Upper Alcoholic | Lower Oily | Upper Alcoholic | Lower Oily | Upper Alcoholic |
| Castor | Miscible | | Miscible | | Miscible | |
| Coconut | Miscible | | Solidified | | (1) | |
| Corn | 7.3 | 2.7 | 6.5 | 3.5 | (2) | |
| Cottonseed | 8.0 | 2.0 | 7.0 | 3.0 | (2) | |
| Linseed | 7.8 | 2.2 | 5.5 | 4.5 | (2) | |
| Olive | 8.0 | 2.0 | 7.0 | 3.0 | (2) | |
| Peanut | 7.0 | 3.0 | 6.2 | 3.8 | (2) | |
| Safflower | 6.5 | 3.5 | 5.5 | 4.5 | (2) | |
| Soybean (refined) | 6.7 | 3.3 | 6.0 | 4.0 | (2) | |
| Soybean (raw) | 7.0 | 3.0 | 6.5 | 3.5 | (2) | |
| Sunflower | 6.8 | 3.2 | 5.5 | 4.5 | (2) | |

[1] Would remain solid at this temperature.
[2] At 40° F., the separation is greater than at 70° F.; at 0° F. the separation would be even greater.

The above tests for miscibility were made at temperatures normally encountered in the storage and use of pesticide compositions for treating animals. The miscibility was ascertained at each temperature by pouring 5 milliliters of isopropanol into each of a series of graduated test tubes, of which each contained 5 milliliters of one of the oils. Each of the tubes containing the resulting oil-isopropanol mixture was shaken vigorously for one minute and then allowed to stand for two hours. The resulting mixtures were then shaken vigorously again for one minute and allowed to stand overnight, approximately 16 hours. In each instance, it was ascertained that the oil had a density greater than that of the alcohol with the result that, except where miscibility was complete or essentially so, the resulting mixture segregated into an upper alcoholic and a lower oily layer as distinct phases. The comparison shows that of the common vegetable oils, only castor oil remained miscible at all temperature levels.

In additon to the above test, checks were made to determine if the miscibility of the isopropanol-castor oil solvent mixture remained the same when the toxicants were added. A true solution remained for at least 48 hours at the above temperature levels in the case of each toxicant of the present invention and mixtures thereof.

It is imperative that the solvent mixture be completely miscible; otherwise, a separation of the oil from the alcohol will occur, resulting in poor spreading of the formulation and the danger of high skin injury. The pesticide will have poor contact with the animal with attendant undesirable results.

The organophosphorus pesticide may be dissolved in the mixture by simply adding it thereto, preferably in finely divided form, and stirring. Once dissolved, the formulation does not separate, but results in a stable composition which is in a ready-to-use form.

In a representative operation, 20 percent by weight of the methyl ester of N-methyl-O-(4-tertiary-butyl-2-chlorophenyl) phosphoramidic acid, representing 18.6 percent by weight of the total composition of the pure compound and 1.4 percent of related compounds, was mixed and stirred into a solvent mixture consisting essentially of 76.3 percent by weight isopropanol in 23.7 percent by weight castor oil. The mixing and stirring were carried out at room temperature and resulted in the preparation of a pale yellow colored, oily liquid pesticide formulation of which the specific gravity was 0.863 at 20° C., containing the indicated phosphoramidate at a concentration of 1⅓ pounds per gallon.

This composition was tested by applying it to the back of a cow infested with grubs (the hypodermal larval phase of a parasitic fly (*Hypoderma lineatum* de Vill)) by pouring it onto the animal essentially in a line along the animal's backbone at a rate of approximately an ounce per hundred pounds weight of animal. The toxicant acted in the desired manner; that is to say, the animal was essentially unaffected except for the well groomed appearance from the application of the oil to its hair coat, whereas the infestation with grubs, as ascertained by palpation, slowly declined in abundance and eventually disappeared.

In substantially the same procedure, O,O-dimethyl-O-(2,4,5-trichlorophenyl) phosphorothioate in an amount equal to 3.95 percent by weight of the total composition was mixed and stirred into a solvent mixture consisting essentially of 80 percent by weight isopropanol and 20 percent by weight castor oil. The mixing and stirring were carried out at room temperature and resulted in preparation of a light colored, oily liquid pesticide formulation.

This composition was tested by applying it to the back of a cow infested with grubs (the hypodermal larval phase of a parasitic fly (*Hypoderma lineatum* de Vill)) by pouring it onto the animal essentially in a line along the animal's backbone at a rate of approximately an ounce per hundred pounds weight of the animal. The toxicant acted in the desired manner. The animal was unharmed and the infestation with grubs declined in abundance and eventually disappeared.

In another operation, a composition was prepared as above, by dissolving into a solvent mixture consisting essentially of 80 percent by weight isopropanol and 20 percent by weight castor oil, a combination of the above two toxicants in an amount equal to 10 percent by weight of the total composition (4-tert-butyl - 2 - chlorophenyl methyl methylphophoramidate-6 percent by weight and O,O - dimethyl-O-(2,4,5-trichlorophenyl) phosphorothioate-4 percent by weight). This composition was tested as above with the same results.

Whatever may be the composition chosen, the preparation is carried out in essentially the manner indicated, although the application of gentle heating may hasten a dissolving of the pesticide in the solvent mixture.

What is claimed is:

1. A pesticide composition to be applied to the exterior of an animal comprising essentially from 2–20 percent by weight of the total composition of a phosphate pesticide from the group consisting of 4-tert-butyl-2-chlorophenyl methyl methylphosphoramidate and O,O-dimethyl-O-(2,4,5-trichlorophenyl)phosphorothioate, in a solvent mixture consisting of from 10–25 percent by weight of castor oil and from 90–75 percent by weight of a lower alkanol, said solvent mixture being completely miscible between 0° F and 70° F.

2. A composition according to claim 1 wherein the lower alkanol is isopropanol.

3. A composition according to claim 1 wherein the phosphate pesticide is 4-tert-butyl-2-chlorophenyl methyl methylphosphoramidate.

4. A composition according to claim 3 wherein the lower alkanol is isopropanol.

5. A composition according to claim 1 wherein the phosphate pesticide is O,O - dimethyl - O(2,4,5 - trichlorophenyl) phosphorothioate.

6. A composition according to claim 5 wherein the lower alkanol is isopropanol.

7. A method for controlling parasites in animals which comprises applying to the exterior of an animal a pesticidal amount of a composition comprising essentially from 2–20 percent by weight of the total composition of a systemic phosphate pesticide from the group consisting of 4-tert-butyl-2-chlorophenyl methyl methylphosphoramidate and O,O - dimethyl - O-(2,4,5-trichlorophenyl)phosphorothioate, in a solvent mixture consisting of from 10–25 percent by weight of castor oil and from 90–75 percent by weight of a lower alkanol, said solvent mixture being completely miscible between 0° F and 70° F., said composition being systemic and entering the bloodstream and tissues of the animal thereby killing the parasites.

8. The method according to claim 7 wherein the lower alkanol is isopropanol.

9. The method according to claim 7 wherein the phosphate pesticide is 4-tert-butyl-2-chlorophenyl methyl methylphosphoramidate.

10. The method according to claim 9 wherein the lower alkanol is isopropanol.

11. The method according to claim 7 wherein the phosphate pesticide is O,O-dimethyl-O-(2,4,5-trichlorophenyl) phosphorothioate.

12. The method according to claim 9 wherein the lower alkanol is isopropanol.

References Cited

UNITED STATES PATENTS

| | | | |
|---|---|---|---|
| 2,943,018 | 6/1960 | Wade | 167—53 |
| 2,952,584 | 9/1960 | Whitmore | 167—53 |

FOREIGN PATENTS 3,208  12/1965  Great Britain.

OTHER REFERENCES

Davison: Synopsis of Materia Medica Toxicology and Pharmacology, 3rd ed. (1944). Th. C. V. Mosby Co., St. Louis, Mo., pp. 33–34.

ALBERT T. MEYERS, Primary Examiner

C. J. FRIEDMAN, Assistant Examiner

U.S. Cl. X.R.

424—225, 365